June 12, 1928.
A. E. SCHULZ ET AL
1,673,270
APPARATUS FOR ADVANCING MATERIAL TO MATERIAL WORKING APPARATUS
Filed Dec. 29, 1924
3 Sheets-Sheet 1
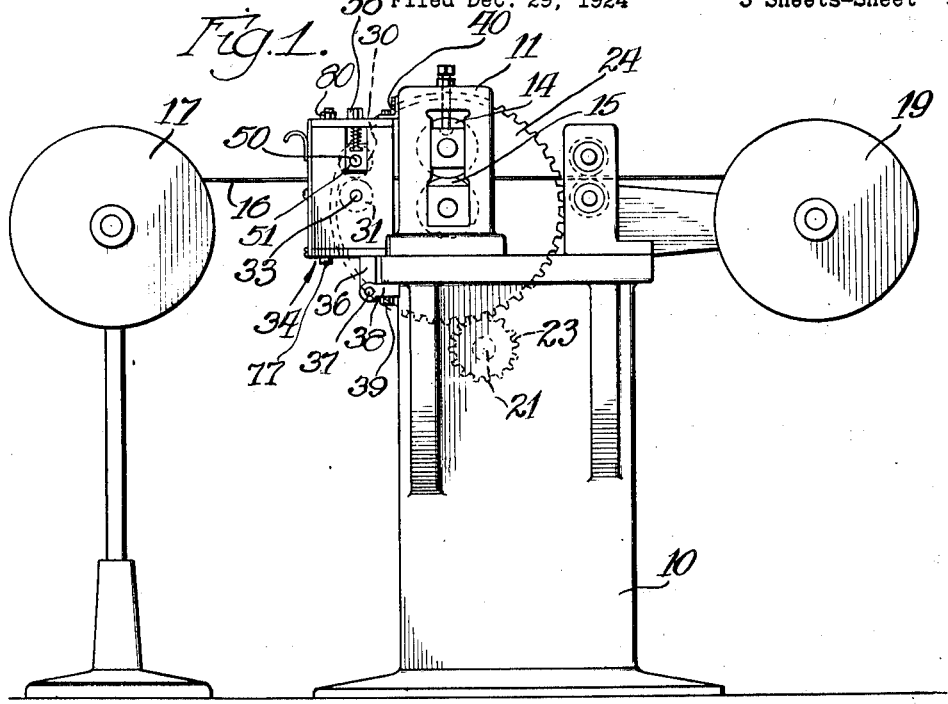
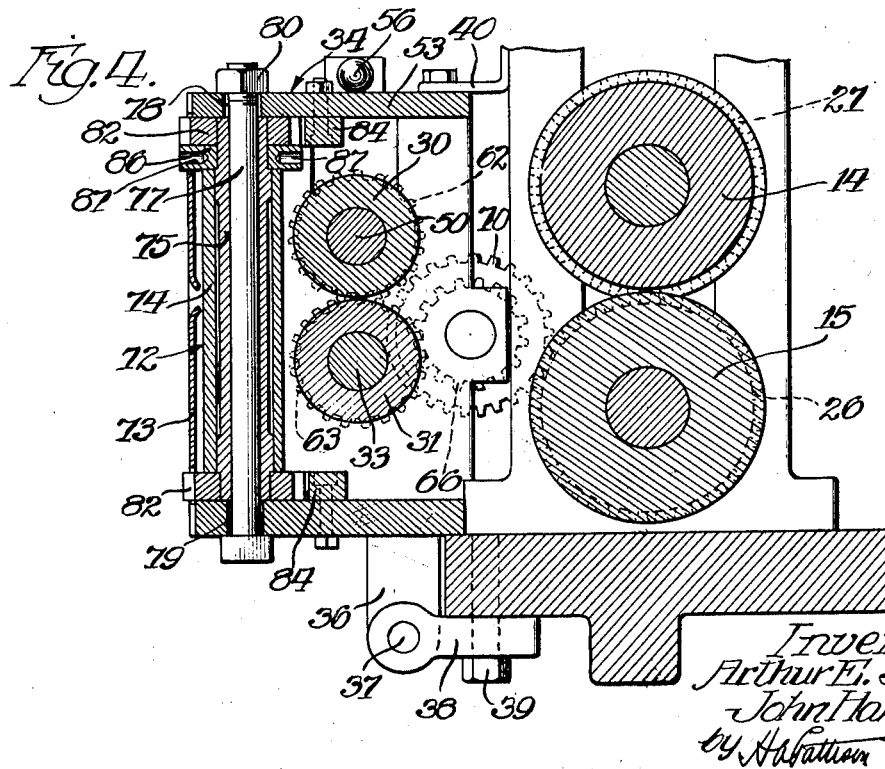

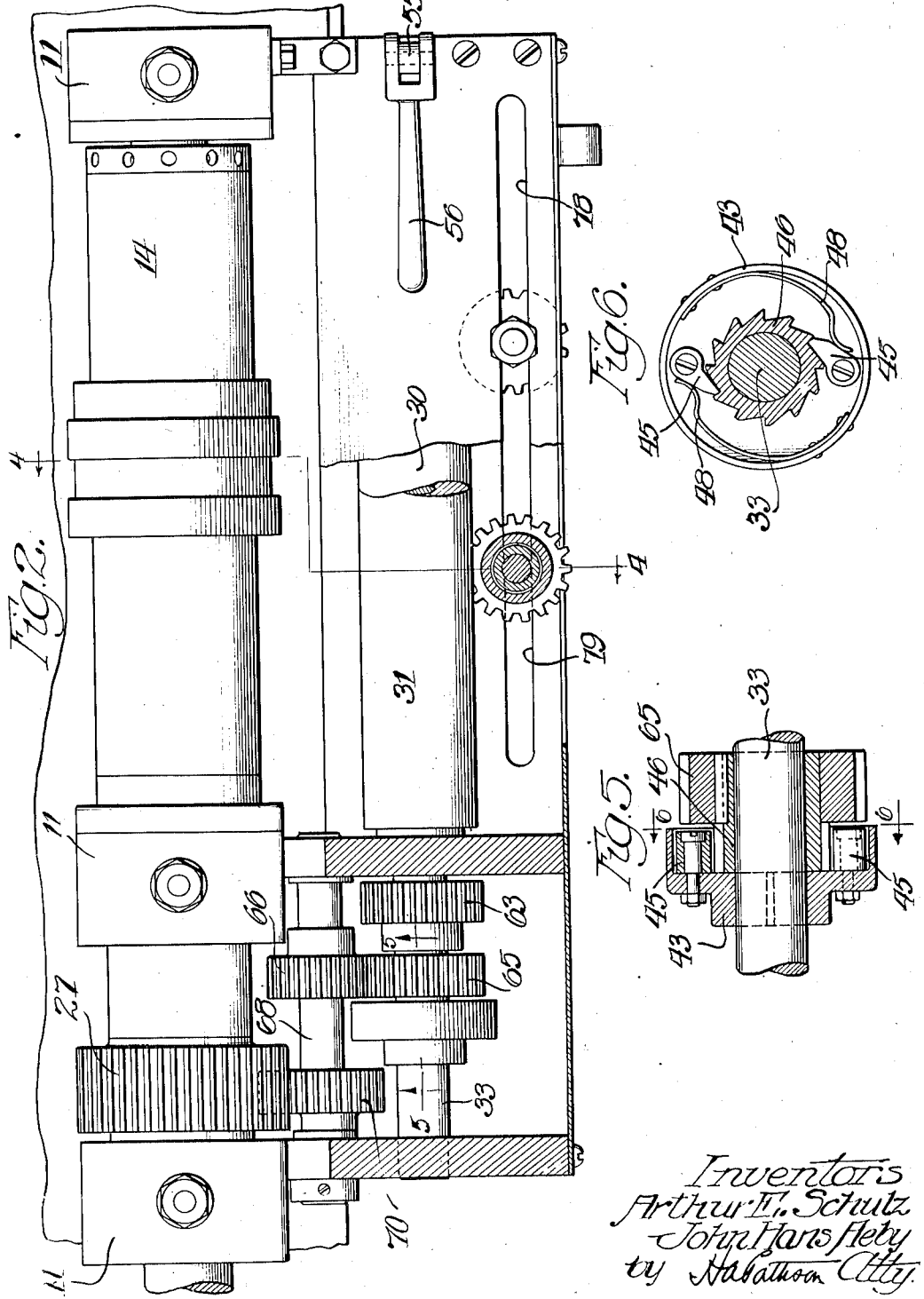

June 12, 1928.
A. E. SCHULZ ET AL
1,673,270
APPARATUS FOR ADVANCING MATERIAL TO MATERIAL WORKING APPARATUS
Filed Dec. 29, 1924    3 Sheets-Sheet 3
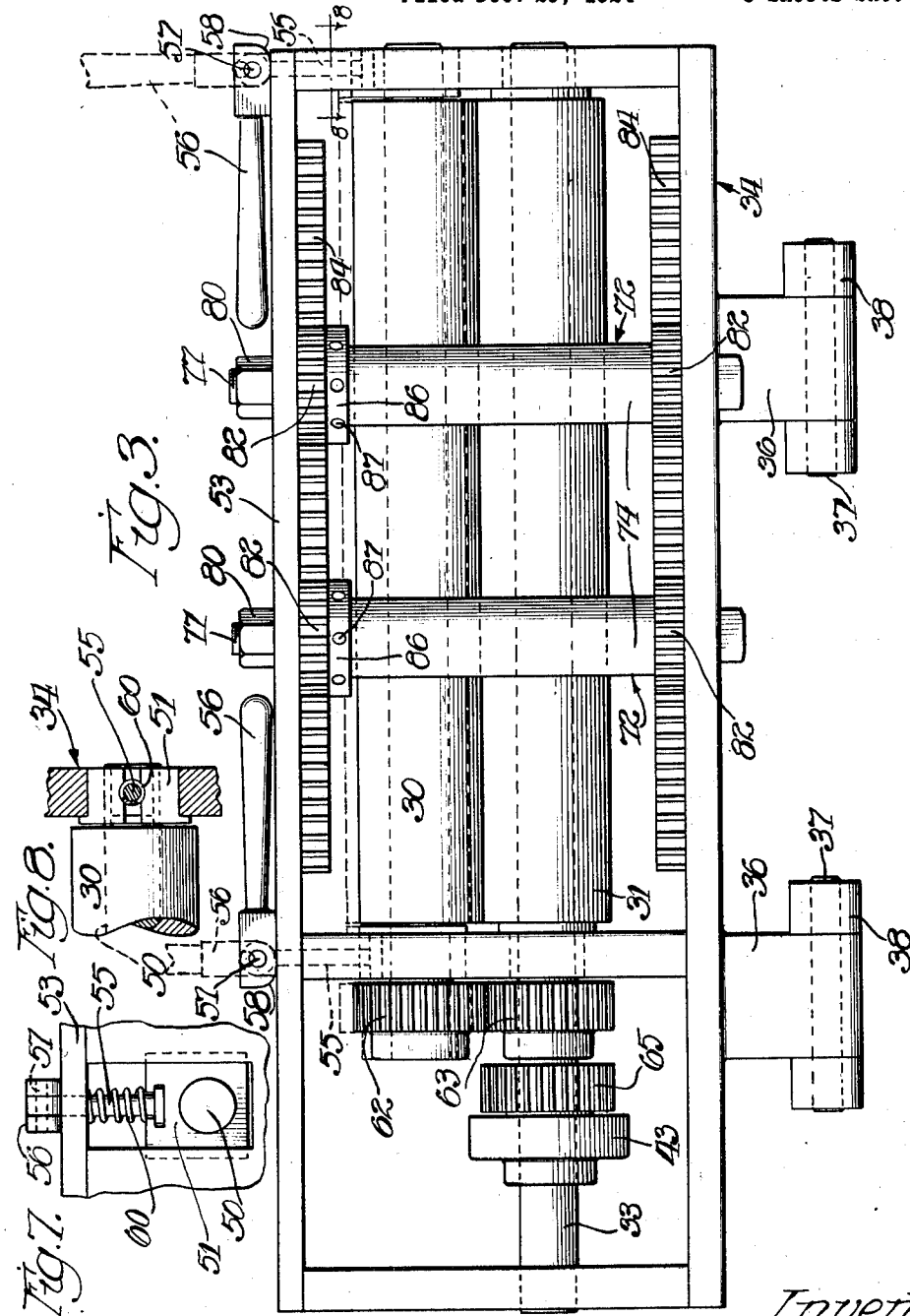
Inventors
Arthur E. Schulz
John Hans Reby
by H.A.Pattison Atty.

Patented June 12, 1928.  1,673,270

UNITED STATES PATENT OFFICE.

ARTHUR EHRHOLD SCHULZ AND JOHN HANS AEBY, OF CHICAGO, ILLINOIS, ASSIGNORS TO WESTERN ELECTRIC COMPANY, INCORPORATED, OF NEW YORK, N. Y., A CORPORATION OF NEW YORK.

APPARATUS FOR ADVANCING MATERIAL TO MATERIAL-WORKING APPARATUS.

Application filed December 29, 1924. Serial No. 758,580.

This invention relates to material working apparatus, and particularly to apparatus for feeding sheet material to slitting rolls or the like.

The object of the invention is to provide improved apparatus for feeding material to material working apparatus.

In one embodiment of the invention feed rolls geared to a pair of rolls adapted to slit sheet material and to advance the material are driven by the gearing to have a surface speed which is lower than the speed at which the slitting rolls advance the material, pawl and ratchet means being interposed between the gearing and the feed rolls to permit the material to drive the feed rolls at the speed imparted to it by the slitting rolls. The feed rolls are adjustable relative to each other to permit the material to be inserted between them, the material being guided as it passes to the feed rolls by a pair of rollers movable into a plurality of parallel positions.

Other features of the invention will become apparent as the following detailed description progresses, reference being had to the accompanying drawings, wherein Fig. 1 is a side view of apparatus embodying the invention;

Fig. 2 is an enlarged plan view, partly in section, of the improved apparatus;

Fig. 3 is a front view thereof, a guard plate having been removed to better illustrate certain details of construction;

Fig. 4 is a section taken on line 4—4 of Fig. 2;

Fig. 5 is an enlarged fragmentary section taken on line 5—5 of Fig. 2;

Fig. 6 is a section taken on line 6—6 of Fig. 5;

Fig. 7 is a fragmentary view of apparatus for adjusting the feed rolls with respect to each other, and Fig. 8 is a section taken on line 8—8 of Fig. 3.

Referring to Figs. 1 and 2, 10 is a base upon which is mounted brackets 11 journaling slitting rolls 14 and 15 adapted to cut sheet metal 16 into strips. The slitting rolls frictionally engage the sheet metal 16 to withdraw it from a supply reel 17 at a speed substantially equal to the surface speed of the slitting rolls. After the sheet metal has been cut into strips, it is wound upon a take-up reel 19 which is driven by any suitable means (not shown).

The means for driving the rolls 14 and 15 comprises a shaft 21 journaled in the base 10 and driven by any suitable means (not shown). A gear 23 secured to the shaft 21 meshes with a gear 24 rigidly secured to the roll 15. A gear 26 also secured to the roll 15 meshes with a gear 27 of equal size secured to the roll 14.

Positioned in front of the rolls 14 and 15 are rolls 30 and 31 adapted to feed the sheet metal 16 to the rolls 14 and 15. The roll 31 is secured to a shaft 33 rotatably journaled in a housing 34 having downwardly extending lugs 36 pivotally secured by pins 37 to brackets 38, the brackets 38 being rigidly secured to the base 10 by bolts 39. L-shaped brackets 40 secured to the housing 34 and to the brackets 11 hold the housing 34 in its proper position with respect to the rolls 14 and 15. It is obvious that the L-shaped brackets 40 may be removed to permit the housing 34 to be swung away from the rolls 14 and 15 if the rolls 14 and 15 are to be replaced or if the apparatus is to be repaired.

Referring to Figs. 2, 5, and 6, 43 is a collar secured to the shaft 33. Pivoted to the collar 43 are pawls 45 which are yieldingly held in engagement with a ratchet 46 by leaf springs 48, the ratchet 46 being rotatably journaled upon the shaft 33. This mechanism constitutes an overrunning clutch, the purpose of which will presently appear.

The roll 30 is secured to a shaft 50 journaled in bearing blocks 51 which are slidably mounted in the housing 34. Secured to each bearing block 51 and slidably journaled in a plate 53 forming part of the housing 34 is a pin 55 which is pivotally secured to a lever 56 by a pin 57. Each lever 56 is provided with a cam surface 58 so designed that when the levers are swung into the positions wherein they are shown in dotted lines in Fig. 3, the roll 30 is spaced from the roll 31 a distance which will permit the operator to quickly insert one end of the sheet metal 16 between them. Compression springs 60 wound upon the pins 55 urge the roll 30 toward the roll 31.

Secured to the roll 30 is a gear 62 meshing with a gear 63 of equal size secured to the roll 31. A gear 65 keyed to the ratchet 46 meshes with a gear 66 secured to a shaft section 68 journaled in the housing 34. A gear 70 secured to the shaft section 68 meshes with the gear 26. The above described gearing is so designed that the surface speed of the feed rolls 30 and 31 is less than the speed at which the slitting rolls 14 and 15 are designed to advance the sheet metal.

Positioned in front of the feed rolls 30 and 31 are a pair of guide rollers 72 and a guard plate 73. Each of the rollers 72 comprises a sleeve 74 journaled upon a tubular member 75 which is rotatably journaled upon a bolt 77 slidably mounted in slots 78 and 79 formed in the housing 34, the bolts 77 being adapted to be secured in a plurality of adjusted positions by nuts 80 threaded upon the bolts. Secured to each end of each tubular member 75 is a gear 82. The gears 82 mesh with racks 84 secured in the housing 34. Also secured to each tubular member 75 is a collar 86 having recesses 87 which may be engaged by any suitable tool for a purpose which will presently appear.

In the operation of the apparatus the rollers 72 are first adjusted to properly guide the work to the slitting rollers 14 and 15. This is done by engaging the recesses 87 with a suitable tool and rotating the tubular members 75 so that the gears 82 roll along the racks 84 in the direction it is desired to move the rollers, the nuts 80 being first loosened. The gears 82 and racks 84 cooperate to hold the rollers 72 in parallel positions during this adjustment. After the rollers 72 have been properly positioned with respect to the rolls 14 and 15 the nuts 80 are tightened to prevent any further displacement of the rollers 72. The levers 56 are then brought into positions wherein they are shown in dotted lines in Fig. 3 to space the roll 30 from the roll 31 a distance which will permit the operator to readily insert the forward end of the sheet metal 16 between these rolls. The levers 56 are then returned to the positions wherein they are shown in full lines in Fig. 3 so that the springs 60 cause the rolls 30 and 31 to frictionally engage the sheet metal 16. The apparatus is then set in operation by operatively connecting the shaft 21 with the aforementioned suitable means (not shown) for driving it. The rolls 14 and 15 are then driven through the gears 23, 24, 26, and 27. The ratchet 46 is rotated by the gear 65 in a clockwise direction (Fig. 6) and it rotates the roll 31 by engaging the pawls 45. The roll 30 is driven by the gears 62 and 63. The rolls 30 and 31 then feed the sheet metal 16 to the slitting rolls 14 and 15 at a speed which is much less than the speed at which the rolls 14 and 15 are adapted to advance the sheet metal. When the rolls 14 and 15 engage the forward end of the sheet metal 16, they draw it through the rolls 30 and 31 at a speed substantially equal to their surface speed. As the rolls 30 and 31 frictionally engage the sheet metal, they are rotated by the sheet metal, the pawls 45 advancing over teeth of the ratchet 46 which continues to rotate at the lower speed. It is apparent that the feed rolls 30 and 31 do not retard the sheet metal as it passes between them and that the slitting rolls 14 and 15 can operate efficiently at high speed. This insures a maximum output for the apparatus, but as the operator is not required to feed the sheet metal directly to the slitting rolls 14 and 15, there is no risk that the operator will be injured by the slitting rolls or cut by the sheet metal as it is seized and advanced by these rapidly revolving rolls.

What is claimed is:

1. In material working apparatus, means adapted to advance the material at a predetermined speed, means anterior of the first-mentioned means for feeding the material to the first-mentioned means, means for driving the feeding means to feed the material at a speed different from the speed at which it is advanced by the first-mentioned means, means interposed between the driving and the feeding means for permitting the material to drive the feeding means at the speed it is advanced by the first-mentioned means, and means for moving the feeding means out of operative relation with the first-mentioned means.

2. In material working apparatus, means adapted to advance sheet material at a predetermined speed, a pair of rolls for feeding the material to the first-mentioned means, means for so driving the rolls that they have a surface speed different from the speed at which the first-mentioned means advances the material, means interposed between the driving means and the rolls for permitting them to rotate with a surface speed substantially equal to the speed at which the first-mentioned means advances the material, and means for moving the pair of rolls and means interposed therebetween and the driving means out of operative relation with the first-mentioned means along a fixed path.

3. In material working apparatus, a roller for guiding the material and movable toward or from the material in a direction at an angle to its axis of rotation, and means including racks and pinions operatively connected to the ends thereof for causing the roller to remain parallel to its first position when it is moved from that position to a second position.

In witness whereof, we hereunto subscribe our names this 17th day of December A. D., 1924.

ARTHUR EHRHOLD SCHULZ.
JOHN HANS AEBY.